United States Patent
Xiong (10) Patent No.: US 10,820,040 B2
(45) Date of Patent: Oct. 27, 2020

(54) TELEVISION TIME SHIFTING CONTROL METHOD, SYSTEM AND COMPUTER-READABLE STORAGE MEDIUM

(71) Applicant: SHENZHEN SKYWORTH-RGB ELECTRONIC CO., LTD., Shenzhen, Guangdong (CN)

(72) Inventor: Yueping Xiong, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 13 days.

(21) Appl. No.: 16/338,995

(22) PCT Filed: Feb. 6, 2018

(86) PCT No.: PCT/CN2018/075393
§ 371 (c)(1),
(2) Date: Apr. 3, 2019

(87) PCT Pub. No.: WO2019/100594
PCT Pub. Date: May 31, 2019

(65) Prior Publication Data
US 2020/0275151 A1    Aug. 27, 2020

(30) Foreign Application Priority Data

Nov. 21, 2017 (CN) .......................... 2017 1 1163247

(51) Int. Cl.
*H04N 21/43* (2011.01)
*H04N 21/432* (2011.01)
(Continued)

(52) U.S. Cl.
CPC ..... *H04N 21/4325* (2013.01); *H04N 21/4334* (2013.01); *H04N 21/44218* (2013.01); *H04N 21/47217* (2013.01)

(58) Field of Classification Search
None
See application file for complete search history.

(56) References Cited

U.S. PATENT DOCUMENTS

2007/0201824 A1* 8/2007 Masaki .............. H04N 21/4383
386/230
2014/0201767 A1* 7/2014 Seiden ............... H04N 21/4325
725/12
(Continued)

FOREIGN PATENT DOCUMENTS

CN     103873923 A    6/2014
CN     103916711 A    7/2014
(Continued)

OTHER PUBLICATIONS

The extended European Search Report of counterpart European Patent Application No. 18869471.5 dated Mar. 31, 2020.

*Primary Examiner* — Eileen M Adams (57) ABSTRACT

Disclosed are a television time shifting control method, a television time shifting control system and a computer-readable storage medium. The television time shifting control method, applied to the television time shifting control system, includes the steps as follows: acquiring a captured picture of a preset area via the camera module, and sending the picture to the recognition module by the television; acquiring picture information of the picture using a preset algorithm by the recognition module; sending a control instruction to the time shifting control module based on the picture information by the recognition module; and performing time shifting control according to the control instruction by the time shifting control module. The present disclosure (Continued)

simplifies the time shifting function, and improves user's viewing experience.

8 Claims, 5 Drawing Sheets

(51) Int. Cl.
*H04N 21/472* (2011.01)
*H04N 21/442* (2011.01)
*H04N 21/433* (2011.01)

(56) References Cited

U.S. PATENT DOCUMENTS

2015/0319400 A1  11/2015  Golyshko
2015/0326908 A1  11/2015  Osminer et al.

FOREIGN PATENT DOCUMENTS

| CN | 105007520 A | 10/2015 |
| CN | 106792179 A | 5/2017 |
| EP | 1843591 A1 | 10/2007 |
| EP | 2544185 A1 | 1/2013 |
| EP | 2958335 A1 | 12/2015 |

* cited by examiner

TELEVISION TIME SHIFTING CONTROL METHOD, SYSTEM AND COMPUTER-READABLE STORAGE MEDIUM

FIELD

The present disclosure relates to the field of television technology, and more particularly relates to a television time shifting control method, a television time shifting control system, and a computer-readable storage medium.

BACKGROUND

Since the birth of television technology, television programs are almost broadcasted in chronological order, thus users can only watch TVs passively. With the development of the television technology, time-shifted televisions are produced, with which users can pause, rewind, or fast forward at any time by starting a time shifting function of the time-shifted television, so as to view missed television programs. Usually, during watching TVs, the user may encounter unforeseen circumstances to leave and pause viewing. The time shifting control function can be manually started to record the currently played program, if the user is unwilling to miss any parts of the program. However, it is complex to start this function, and in most cases, there is little time for the user to complete the starting, both of which cause inconveniences and troubles to the user. Therefore, the existing time-shifted television is inconvenient for users to start the time shifting function and has poor user experience.

SUMMARY

It is one main objective of the present disclosure to provide a television time shifting control method, a television time shifting control system, and a computer-readable storage medium, aiming to overcome the inconvenience for users to start the time shifting function and poor user experience.

In order to realize the above aim, the present disclosure provides a television time shifting control method, which is applied to a television time shifting control system. The television time shifting control system at least includes: a television, a camera module, a recognition module, and a time shifting control module. The television time shifting control method includes:

acquiring a captured picture of a preset area via the camera module, and sending the picture to the recognition module by the television;

acquiring picture information of the picture using a preset algorithm by the recognition module;

sending a control instruction to the time shifting control module based on the picture information by the recognition module; and performing time shifting control according to the control instruction by the time shifting control module.

Optionally, the recognition module acquires state information and body feature information of a user in the picture using the preset algorithm, and takes the body feature information of the user as identity information of the user;

the step of sending a control instruction to the time shifting control module based on the picture information by the recognition module includes:

determining a state of the user according to the state information and a preset condition by the recognition module; and sending a video-recording instruction to the time shifting control module by the recognition module when the user is in a nonviewing state, the video-recording instruction including the identity information of the user;

the step of performing time shifting control according to the control instruction by the time shifting control module includes:

generating a video-recording task according to the video-recording instruction, and recording a video according to the video-recording task and a television signal of a currently played television program by the time shifting control module.

Optionally, the nonviewing state includes a ready-to-leave state or a nonviewing orientation state.

Optionally, after the step of determining a state of the user according to the state information and a preset condition by the recognition module, the method further includes:

determining whether the identity information is associated with the video-recording task that is currently being performed by the time shifting control module, when the user is in a viewing state; and sending a video-recording stopping instruction to the time shifting control module by the recognition module, when the identity information is associated with the video-recording task that is currently being performed.

Optionally, after the step of sending a video-recording stopping instruction to the time shifting control module by the recognition module, the method further includes:

determining a video-recording duration of the video-recording task by the time shifting control module, when the video-recording stopping instruction is received;

judging whether the video-recording duration is less than a preset duration by the television time shifting control system; and terminating the video-recording task and deleting a corresponding cached video by the time shifting control module, when the video-recording duration is less than the preset duration.

Optionally, the time shifting control module sends a prompt message of whether to play back to the television, when the video-recording duration is larger than or equal to the preset duration; and the television plays back the corresponding cached video according to request information of accepting the playback when receiving the request information, and sends a video-recording continuing instruction to the time shifting control module, to allow the time shifting control module to continue recording the video according to the television signal.

Optionally, after the step of sending a prompt message of whether to play back to the television by the time shifting control module, the method further includes:

continuingly broadcasting the television program according to the television signal when the television receives request information that the user rejects the playback, and sending a video-recording terminating instruction to the time shifting control module to terminate the video-recording task by the television; and terminating the corresponding video-recording task by the time shifting control module based on the video-recording terminating instruction.

Optionally, after the step of terminating the corresponding video-recording task by the time shifting control module based on the video-recording terminating instruction, the method further includes:

deleting the corresponding cached video by the time shifting control module.

In addition, in order to realize the above aim, the present disclosure also provides a television time shifting control system, the television time shifting control system at least includes: a television, a camera module, a recognition module, a time shifting control module, a memory, a processor, and a television time shifting control program stored in the memory, the television time shifting control program when being executed by the processor performs steps of the above television time shifting control method.

In addition, in order to realize the above aim, the present disclosure also provides a computer-readable storage medium. The computer-readable storage medium stores a television time shifting control program when being executed by the processor performs steps of the above television time shifting control method.

The present disclosure provides a television time shifting control method, which is applied to a television time shifting control system. The television time shifting control method includes the steps as follows: acquiring a captured picture of a preset area via the camera module, and sending the picture to the recognition module by the television; acquiring picture information of the picture using a preset algorithm by the recognition module; sending a control instruction to the time shifting control module based on the picture information by the recognition module; and performing time shifting control according to the control instruction by the time shifting control module. In this way, the user's current state is recognized according to the picture captured to the user, and the starting of the time shifting control is determined based on the user's current state, which overcomes the inconvenience of starting the time shifting control function and improves the experience of viewing.

DETAILED DESCRIPTION OF THE EMBODIMENTS

It will be appreciated that the specific embodiments described herein are merely illustrative of the present disclosure and are not intended to limit the present disclosure.

In the related art, the time shifting control function can be manually started to record the currently played program. However, it is complex to start this function, and in most cases, there is little time for users to complete the starting, both of which cause inconveniences and troubles to users.

To solve the technical problem above, the present disclosure provides a television time shifting control method, which is applied to a television time shifting control system. The television time shifting control system includes: a television, a camera module, a recognition module, and a time shifting control module. The television time shifting control method includes the steps as follows: acquiring a captured picture of a preset area via the camera module, and sending the picture to the recognition module by the television; acquiring picture information of the picture using a preset algorithm by the recognition module; sending a control instruction to the time shifting control module based on the picture information by the recognition module; and performing time shifting control according to the control instruction by the time shifting control module. As such, the time shifting control is simplified, and the experience of viewing is improved.

Figure 1:
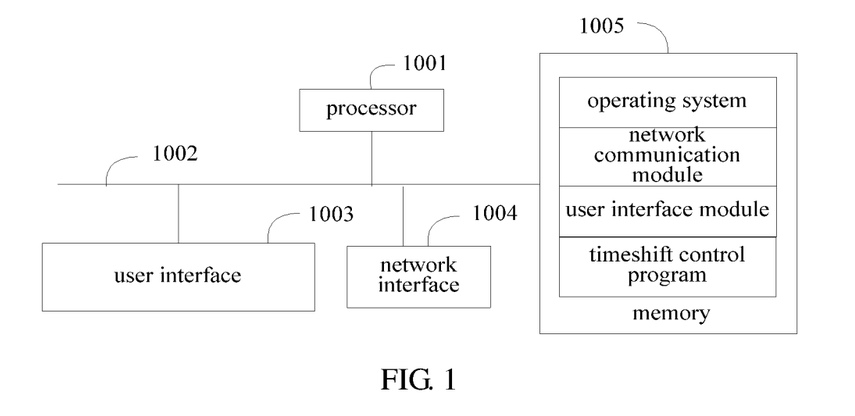
FIG. 1 is a schematic diagram of a system in terms of hard operating environment involved in the embodiments according to the present disclosure.

Referring to FIG. 1, FIG. 1 is a schematic diagram of a system in terms of hard operating environment involved in the embodiments according to the present disclosure.

The terminal in the embodiment of the present disclosure may be a personal computer (PC), or may be a mobile terminal device having a display function, such as a smart phone, a tablet computer, an e-book reader, an MP3 (Moving Picture Experts Group Audio Layer III) player, an MP4 (Moving Picture Experts Group Audio Layer IV) player, a portable computer, and so on.

As illustrated in FIG. 1, the terminal may include: a processor 1001, such as CPU, a network interface 1004, a user interface 1003, a memory 1005, and a communication bus 1002. The communication bus 1002 is configured to facilitate connection and communication between these components. The user interface 1003 may include a display, an input unit such as a keyboard, and an optional user interface 1003 may also include a standard wired interface and wireless interface. The network interface 1004 may optionally include a standard wired interface, and a wireless interface (such as a WI-FI interface). The memory 1005 may be a high-speed RAM memory, or a non-volatile memory such as a disk memory. The memory 1005 optionally may also be a storage device that is separate from the processor 1001 described above.

Optionally, the terminal may also include a camera, a RF (Radio Frequency) circuitry, a sensor, an audio circuitry, a Wi-Fi module, and the like. The sensor is such as a light sensor, a motion sensor or other sensor. Specifically, the light sensor may include an ambient light sensor and a proximity sensor, wherein, the ambient light sensor can adjust the brightness of the display according to the light of the ambient light, and the proximity sensor can turn off the display and/or the backlight when the mobile terminal moves to the ear. As one kind of the motion sensor, a gravity acceleration sensor can detect the magnitude of acceleration in each direction (usually three axes), and can detect the magnitude and direction of gravity when stationary, as well as can be used to identify the posture of the mobile terminal (such as horizontal and vertical screen switching, related games, magnetometer attitude calibration), vibration recognition related functions (such as pedometer, tapping), and so on. Of course, the mobile terminal can also be equipped with other sensors such as a gyroscope, a barometer, a hygrometer, a thermometer, an infrared sensor, and the like. Thus, they are not to be detailed herein again.

Those skilled in the art can understand that the structure of the terminal illustrated in FIG. 1 does not constitute a limitation on the terminal. Thus, the terminal may include more or less components than those illustrated, or some components to be combined, or different arrangements of components.

As illustrated in FIG. 1, the memory 1005 as a computer storage medium may include an operating system, a network communication module, a user interface module and a television time shifting control program.

In the terminal illustrated in FIG. 1, the network interface 1004 is mainly configured to connect a background server and communicate data with the background server. The user interface 1003 is mainly configured to connect the client (user side) and communicate data with the client. And the processor 1001 may be configured to execute the television time shifting control program stored in the memory 1005, and perform the following operations:

acquiring a captured picture of a preset area via the camera module, and sending the picture to the recognition module by the television;

acquiring picture information of the picture using a preset algorithm by the recognition module;

sending a control instruction to the time shifting control module based on the picture information by the recognition module; and performing time shifting control according to the control instruction by the time shifting control module.

In some embodiments, the processor 1001 is configured to execute the television time shifting control program stored in the memory 1005 to further perform the following operations:

acquiring state information and body feature information of a user in the picture using the preset algorithm, and taking the body feature information of the user as identity information of the user by the recognition module;

determining a state of the user according to the state information and a preset condition by the recognition module; and sending a video-recording instruction to the time shifting control module by the recognition module when the user is in a nonviewing state, the video-recording instruction including the identity information of the user;

generating a video-recording task according to the video-recording instruction, and recording a video according to the video-recording task and a television signal of a currently played television program by the time shifting control module.

In some embodiments, the processor 1001 is configured to execute the television time shifting control program stored in the memory 1005 to further perform the following operations:

determining whether the identity information is associated with the video-recording task that is currently being performed by the time shifting control module, when the user is in a viewing state; and sending a video-recording stopping instruction to the time shifting control module by the recognition module, when the identity information is associated with the video-recording task that is currently being performed.

In some embodiments, the processor 1001 is configured to execute the television time shifting control program stored in the memory 1005 to further perform the following operations:

determining a video-recording duration of the video-recording task by the time shifting control module, when the video-recording stopping instruction is received;

judging whether the video-recording duration is less than a preset duration by the television time shifting control system; and terminating the video-recording task and deleting a corresponding cached video by the time shifting control module, when the video-recording duration is less than the preset duration.

In some embodiments, the processor 1001 is configured to execute the television time shifting control program stored in the memory 1005 to further perform the following operations:

sending a prompt message of whether to play back to the television by the time shifting control module, when the video-recording duration is larger than or equal to the preset duration; and playing back the corresponding cached video according to request information of accepting the playback when the television receives the request information, and sending a video-recording continuing instruction to the time shifting control module by the television, to allow the time shifting control module to continue recording the video according to the television signal.

In some embodiments, the processor 1001 is configured to execute the television time shifting control program stored in the memory 1005 to further perform the following operations:

continuingly broadcasting the television program according to the television signal when the television receives request information that the user rejects the playback, and sending a video-recording terminating instruction to the time shifting control module to terminate the video-recording task by the television; and terminating the corresponding video-recording task by the time shifting control module based on the video-recording terminating instruction.

In some embodiments, the processor 1001 is configured to execute the television time shifting control program stored in the memory 1005 to further perform the following operation:

deleting the corresponding cached video by the time shifting control module.

Figure 2:
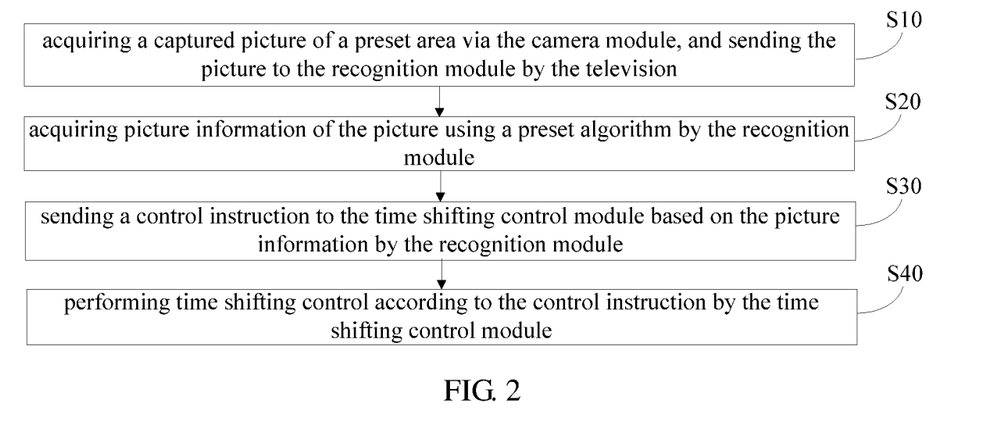
FIG. 2 is an illustrative flowchart of a first embodiment of a television time shifting control method according to the present disclosure.

Referring to FIG. 2, FIG. 2 is an illustrative flowchart of a first embodiment of a television time shifting control method according to the present disclosure.

The television time shifting control method according to the present disclosure is mainly applied to the field of the television technology. Since the birth of television technology, television programs are almost broadcasted in chronological order, thus users can only watch TVs passively. With the development of the television technology, time-shifted televisions are produced, with which users can pause, rewind, or fast forward at any time by starting a time shifting function of the time-shifted television, so as to view missed television programs. Usually, during watching TVs, the user may encounter unforeseen circumstances to leave and pause viewing. The time shifting control function can be manually started to record the currently played program, if the user is unwilling to miss any parts of the program. However, it is complex to start this function, and in most cases, there is little time for the user to complete the starting, both of which cause inconveniences and troubles to the user. Therefore, the existing time-shifted television is inconvenient for users to start the time shifting function and has poor user experience.

This embodiment provides a method for automatically recognizing the user's state and performing time shifting control according to the user's state. The television time shifting control method is applied to the television time shifting control system. The television time shifting control system includes a television, a camera module, a recognition module, and a time shifting control module. The television of this embodiment is a device for playing television programs according to external television signals received, which includes a power system, a control system, and an audiovisual system. The camera module, which is connected to the television, is configured to capture an area within a visual range of the television to obtain a picture when the television is turned on, and send the captured picture to the television. The recognition module, which is connected to the television and the time shifting control module, is a processing module based on body detection and recognition technology. The recognition module is configured to analyze body feature information or other feature information in the picture captured by the camera module, and take the body feature information as the identity information of the user, so as to recognize and distinguish different users. The recognition module is also configured to send the control instruction to the time shifting control module according to the analysis of the picture. The time shifting control module, which is connected to the television and the recognition module, is configured to receive and respond to the control instruction sent by the recognition module. The time shifting control module is also configured to obtain the television signal of the current playing television program, record a video according to the television signal, and control program contents played by the television. The time shifting control module can be based on the PVR file system. The camera module, the recognition module or the time shifting control module may be disposed inside the television or outside the television. For the condition of being outside the television, the camera module, the recognition module and the time shifting control module are connected to the television through data lines when in use. The camera module, the recognition module or the time shifting control module may also be integrated into a module, and the integrated module is connected to the television when in use. The specific process of this embodiment is described as follows.

S10, acquiring a captured picture of a preset area via the camera module, and sending the picture to the recognition module by the television.

In this embodiment, the camera can be installed at a position facing the front of the television screen, such as, directly above or below the television. The preset area refers to a space area within a preset range in front of the television. The space area is recognized by the recognition module as a space area in which the user can normally watch television. And the space area can also be captured by the camera. The preset area, which is related to performances and the installation position of the camera, can be determined according to viewing habits of the user. In this embodiment, the camera is configured to capture image information in front of the television at set intervals. The camera captures the visual range of the television, thus a capturing range of the camera can be defined according to the viewing habits of the user and physiological characteristics of human eyes. For example, the capturing range of the camera is defined according to the location area where the user usually watches television, and the farthest distance from the television when the human eyes can clearly see the television picture. In some embodiments, the capturing distance of the camera is defined to be less than or equal to 10 meters, and the capturing angle of the camera is defined to be 120 degrees or more. The camera module may include a camera and a data transmission module. The camera module captures pictures at set intervals, and sends the captured pictures to the television. The television sends the pictures to the recognition module after receiving the pictures captured by the camera module.

S20, acquiring picture information of the picture using a preset algorithm by the recognition module.

Based on the above step, after receiving the picture sent by the television, the recognition module acquires the information in the picture according to the preset algorithm. The preset algorithm determines feature information of the user in the picture by acquiring specific feature points in the picture, then recognizes and distinguishes the user according to the feature information. For example, a face in the picture can be detected and recognized by a face recognition algorithm. After recognizing and distinguishing the user, the recognition module determines whether the user is watching television, according to features such as the posture state of the user in the picture. For example, it is to determine that the user is standing or sitting down, the user is facing the television screen sideways or directly, and the angle of the user's face off the direction of the television screen, so as to determine whether the user is watching television.

S30, sending a control instruction to the time shifting control module based on the picture information by the recognition module.

Based on the above steps, the recognition module analyzes the picture, obtains the face feature information and the state information of the user in the picture, and then sends corresponding control information to the time shifting control module according to the obtained information. The recognition module sends a video-recording instruction to the time shifting control module, when the user in the picture is bowing, or the angle of the user's side face off the television screen satisfies a preset angle, or the user is in a state of standing and being ready to leave. The time shifting control module generates a video-recording task and then starts recording, according to a television signal of a television program which is currently played on television. In some embodiments, it is to determine that whether the user has a video-recording task being currently performed, when the user is in the viewing state, that is, when the user is sitting down with the body directly facing the television screen or the angle of the body facing the television screen sideways satisfying a certain angle range. The determination that the user has the video-recording task currently being performed, means that the user resumes the viewing state after a leaving or a period of the nonviewing state. Without considering other factors, the video-recording task can be stopped. The recognition module sends a video-recording stopping instruction to the time shifting control module.

S40, performing time shifting control according to the control instruction by the time shifting control module.

Based on the above steps, after receiving the video-recording stopping instruction or the video-recording instruction sent by the recognition module, the time shifting control module performs the time shifting control. When receiving the video-recording instruction, the time shifting control module records a video according to the television signal of the television program which is currently played on television, and the television continues broadcasting the television program according to the current television signal. When receiving the video-recording stopping instruction, the time shifting control module sends a message of prompting the user to watch the playback to the television for a better user experience. If the user accepts the playback, the time shifting control module continues recording the video according to the television signal, and sends a playback instruction to the television. The television plays back contents in the cached video after receiving the playback instruction. If the user rejects the playback, the time shifting controller sends an instruction of continuing broadcasting the television program according to the television signal to the television, to allow the television to proceed with the broadcasting of the television program.

In this embodiment, the television time shifting control method is applied to the television time shifting control system. The television time shifting control system includes: the television, the camera module, the recognition module, and the time shifting control module. The television acquires the captured picture of the preset area via the camera module, and sends the picture to the recognition module. The recognition module acquires the picture information of the picture using the preset algorithm. The recognition module sends the control instruction to the time shifting control module based on the picture information. The time shifting control module performs time shifting control according to the control instruction. In this way, the user's current state is recognized according to the picture captured to the user, and the starting of the time shifting control is determined based on the user's current state, which overcomes the inconvenience of starting the time shifting control function and improves user's experience.

Figure 3:
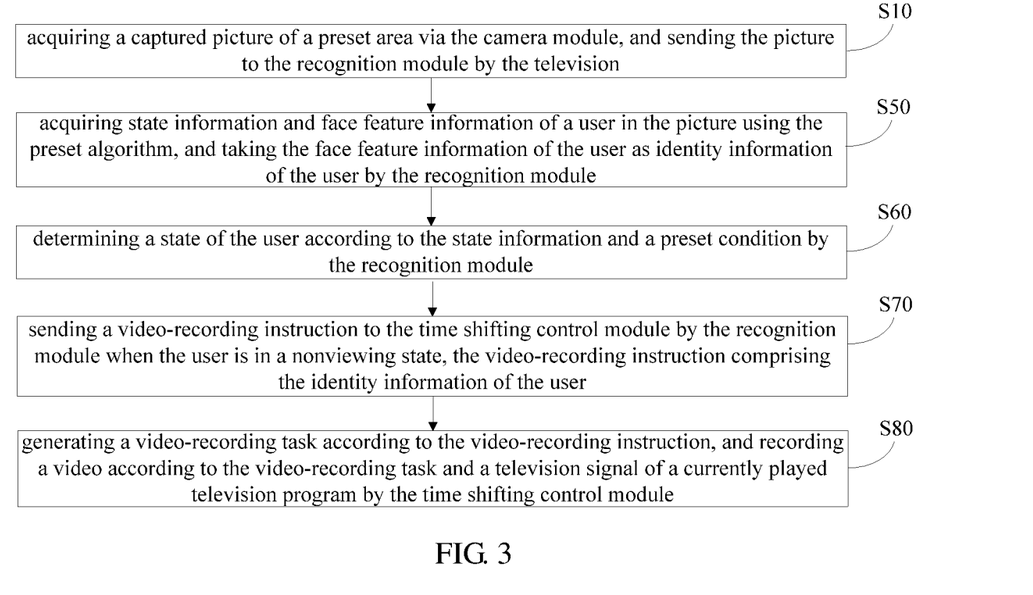
FIG. 3 is an illustrative flowchart of a second embodiment of a television time shifting control method according to the present disclosure.

Further, referring to FIG. 3, FIG. 3 is an illustrative flowchart of a second embodiment of a television time shifting control method according to the present disclosure. Based on the above embodiment of the television time shifting control method according to the present disclosure, a second embodiment of the present disclosure is provided.

In this embodiment, step S20 includes:

S50, acquiring state information and body feature information of a user in the picture using the preset algorithm, and taking the body feature information of the user as identity information of the user by the recognition module.

In this embodiment, step S30 includes:

S60, determining a state of the user according to the state information and a preset condition by the recognition module; and S70, sending a video-recording instruction to the time shifting control module by the recognition module when the user is in a nonviewing state, the video-recording instruction including the identity information of the user, and the nonviewing state including a ready-to-leave state or a nonviewing orientation state.

In this embodiment, step S40 includes:

S80, generating a video-recording task according to the video-recording instruction, and recording a video according to the video-recording task and a television signal of a currently played television program by the time shifting control module.

Based on the above embodiments, in this embodiment, the acquired picture information includes body feature information of the user and state information of the user. The body feature information may include face feature information or feature information of other parts of the body. Taking the face feature information for example, the face feature information is acquired by using a face detection algorithm. Facial features, the shape and the orientation angle of the face are calculated and analyzed by using a core algorithm, after the face image of the user is acquired. The face recognition is a method using a single training sample based on the local feature area, including the following steps: first, defining a local area; second, extracting features from the local area of the face, and mapping a face image vector into a face feature vector according to a transformation matrix obtained after a sample training; third, selecting local features; and the latter step, classifying. The classifier mostly uses a form of combined classifiers. Each of the local features corresponds to one classifier, and subsequently a final recognition result can be obtained by means of voting or linear weighting. The face recognition comprehensively adopts a variety of techniques, such as digital image/video processing, pattern recognition, and computer vision. The core technology thereof is the face recognition algorithm. Currently, the face recognition algorithm mainly includes four kinds: a recognition based on face feature points, a recognition based on the whole of the face image, a recognition based on a template, and a recognition based on a neural network.

The face detection, as the first step of the face recognition, is to detect the face from the background image. The face detection is proven to be a complex task, since it is susceptible to the impact of various factors, such as image background, brightness changes, and head postures. Detection and positioning: detection is to find a face in an image, and positioning is to give the position of the face in the image. The face image information obtained after the positioning is in the measure space. Data in the measure space is mapped into a feature space, so as for the recognition. The principal component analysis is to project a high-dimensional vector into a low-dimensional vector space through a special eigenvector matrix, to obtain a low-dimensional vector, only losing some secondary information. By extracting features from the face image after the detection and positioning, image dimensions can be reduced, thereby reducing recognition calculation amount and improving recognition accuracy. The face recognition system, according to a set of face training samples, uses the principal component analysis (PCA) based on the feature face to construct a principal subspace. During the detection, a test image is projected onto the principal space to obtain a set of projection coefficients, then the set of projection coefficients are compared with each of known face image modes, so as to obtain a detection result. Each time the recognition module acquires face feature information of a new user, the feature information can be used as the identity information of the new user and stored in a preset position, so as to subsequently recognize and track the identity and the state of the user, and create a time shifting video correspondingly.

The recognition module determines whether the user is watching television according to features such as the posture of the user in the picture, after recognizing and distinguishing the user. For example, it is to analyze that the user is standing or sitting down, or the user is facing the television screen directly or sideways, or the angle of the user's face off the direction of the television screen, so as to determine whether the user is watching television. A condition for determining the state of the user may be defined in advance. The user is determined in a standing state, when the feature of the user's posture in the picture satisfies a certain condition; and the user is determined in a sitting state, when another feature is satisfied. In this embodiment, the standing state of the user can be determined as a ready-to-leave state. The non-orientation state refers to a state that an angle between the user's sight line and the connection line of the user and the television exceeds a certain preset angle. The user cannot watch television normally when the preset angle is exceeded. The preset angle may vary with different position of the user. For example, the orientation angle that allows the user to watch television normally is relatively larger, when the user is directly facing the television. However, the orientation angle that allows the user to watch television normally is relatively smaller, when the user is at one side of the television. After acquiring information of the orientation angle of the user in the picture, the recognition module compares the orientation angle of the user with the corresponding preset angle, so as to determine whether the user is in the nonviewing state.

The recognition module sends a video-recording instruction to the time shifting control module, when the user is in the nonviewing state. The video-recording instruction includes the identity information of the user. Thus according to the user identity information, the time shifting control module creates a folder with the user image as a distinguishing feature to store the cached video of the video-recording task. In this embodiment, the television signal is an external source of the television program data. And the time shifting control module may be based on the PVR file system. The PVR is personal video recorder, which is characterized by the use of a hard disk as a storage medium, to establish a local mass buffer and a huge program storage library. The PVR uses digital processing technology to realize control and management of programs. Digitization and storage technology are at the heart of the PVR. The PVR technology is applied in the digital television system. Compared to analog PVR, digital work is in the front end, instead of digital coding being performed at each client. The following is the description of the PVR time shifting control process. A receiver demultiplexes the television signal of the selected digital television program by a high-frequency head demodulation and demultiplexing module, to obtain television signal data. During the normal viewing process, the demultiplexed television signal data is simultaneously sent to a decoder through channel 1 for decoding, so as to output a video for broadcasting. During the video-recording process, the television signal data is transmitted from channel 2 to the hard disk and then stored. The receiver is switching to the time shifting state, when the user performs operations such as pause, rewind, slow release. The channel 1 is cut off, while the decoder decodes and outputs the data from the hard disk through the channel 2. In this embodiment, a cloud can be replaced by another cloud, when the television is in a networking state. After generating the video-recording task, the time shifting control module starts recording television data from a current node of the television program, and buffers the television data in a corresponding folder from the current node.

In this embodiment, the recognition module acquires the state information and the body feature information of the user in the picture by using the preset algorithm, and uses the body feature information of the user as the identity information of the user. The recognition module determines the state of the user according to the state information and the preset condition. The recognition module sends the video-recording instruction to the time shifting control module, when the user is in the nonviewing state. The video-recording instruction includes the identity information of the user. The time shifting control module generates the video-recording task according to the video-recording instruction, and records a video according to the video-recording task and the television signal of the currently played television program. In this way, the viewing state is automatically recognized by analyzing the body feature information and the state information of the user in the picture. And the television program is recorded when the user is not in the viewing state, to facilitate the user to look back the missed program, thereby improving the user's viewing experience.

Figure 4:
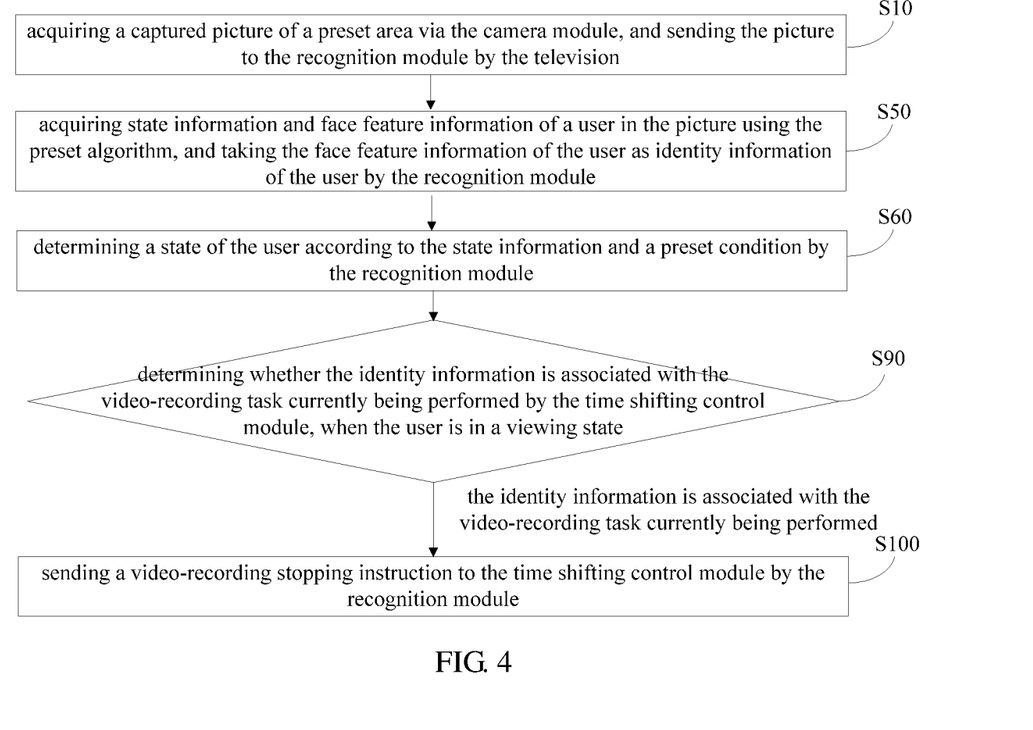
FIG. 4 is an illustrative flowchart of a third embodiment of a television time shifting control method according to the present disclosure.

Further, referring to FIG. 4, FIG. 4 is an illustrative flowchart of a third embodiment of a television time shifting control method according to the present disclosure. Based on the above embodiments of the television time shifting control method according to the present disclosure, a third embodiment according to the present disclosure is proposed.

In this embodiment, after step S60, the method further includes:

S90, determining whether the identity information is associated with the video-recording task that is currently being performed by the time shifting control module, when the user is in a viewing state;

S100, sending a video-recording stopping instruction to the time shifting control module by the recognition module, when the identity information is associated with the video-recording task that is currently being performed.

Based on the above embodiments, in this embodiment, the recognition module may also obtain a result that whether the user is in the viewing state, after analyzing the feature information and the state information of the user in the picture. There may be two situations in which the user is in the viewing state: 1) the user is in the viewing state when beginning the viewing for the first time after the television is turned on; 2) the user is in the viewing state when beginning the viewing at a certain time point after the television is turned on, the user is in the nonviewing state in the middle of the viewing when leaving for something, or bending head down, or the orientation angle is larger than a preset angle, then the user resumes the viewing state at the current time. Based on the above embodiments, for the above situation 2), the time shifting control module generates the video-recording task and starts the video-recording when the user is in the nonviewing state. In this embodiment, the recognition module may store the identity information corresponding to the user in a preset position and remark the corresponding identity information, before sending the video-recording instruction. And the recognition module may send a video-recording stopping instruction to the time shifting control module, when the user resumes the viewing state. After receiving the instruction, the time shifting control module responds according to the recording condition and the user's operation.

In this embodiment, the time shifting control module determines whether the identity information has an ongoing video-recording task, when the user is in the viewing state. The recognition module sends a video-recording stopping instruction to the time shifting control module, when the identity information has the corresponding ongoing video-recording task. In this way, the recognition module, when recognizing the user is in the viewing state, sends the video-recording stopping instruction to the time shifting control module, so as to adjust the time shifting control according to actual state of the user.

Figure 5:
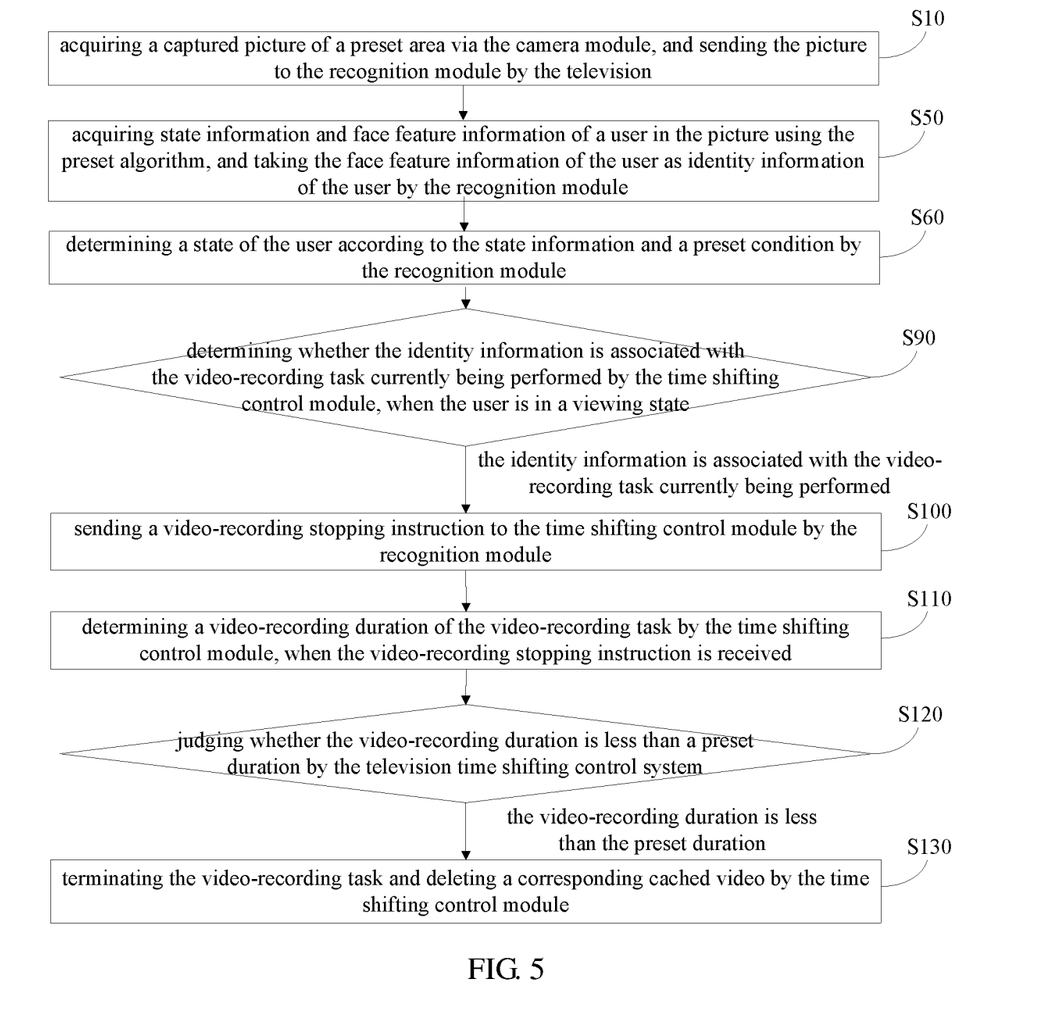
FIG. 5 is an illustrative flowchart of a fourth embodiment of a television time shifting control method according to the present disclosure.

Further, referring to FIG. 5, FIG. 5 is an illustrative flowchart of a fourth embodiment of a television time shifting control method according to the present disclosure. Based on the above embodiments of the television time shifting control method according to the present disclosure, a fourth embodiment according to the present disclosure is proposed.

In this embodiment, after step S100, the method includes:

S110, determining a video-recording duration of the video-recording task by the time shifting control module, when the video-recording stopping instruction is received;

S120, judging whether the video-recording duration is less than a preset duration by the television time shifting control system; and S130, terminating the video-recording task and deleting a corresponding cached video by the time shifting control module, when the video-recording duration is less than the preset duration.

In actual situation, the user can hardly maintain a fixed posture at all times. On the contrary, the user may change his/her posture frequently. For example, the user may leave to take a snack or bow down to pick something during the viewing. Generally, the nonviewing state for a short period has little impact on the user's viewing. In these cases, it is not necessary to save the contents of the video-recording.

In this embodiment, it is to define a preset duration, for example, the preset duration is defined as 5 seconds. The cached video can be deleted, if the duration of the nonviewing state is less than the preset duration. Specifically, the time shifting control module starts recording the television program, when the time shifting control module receives the information sent by the body detecting module. And a timer is started to record a start-recording time. When the time shifting control module receives the video-recording stopping instruction sent by the body detecting module, the timer is started to obtain a current stop-recording time. The video-recording duration is calculated. The time shifting control module deletes the cached video, if the user chooses not to look back, or the video-recording duration is less than the preset duration which does not impact the user's viewing.

In this embodiment, the time shifting control module determines the video-recording duration of the video-recording task, when the time shifting control module receives the video-recording stopping instruction. The television time shifting control system judges whether the video-recording duration is less than the preset duration. The time shifting control module terminates the video-recording task, and deletes the corresponding cached video when the video-recording duration is less than the preset duration. In this way, after receiving the video-recording stopping instruction, the time shifting control module automatically determines whether there is impact on the user's viewing based on the video-recording duration. And the time shifting control module automatically deletes the cached video when no impact on the viewing, so as to avoid interference to the viewing experience caused by the cached video.

Figure 6:
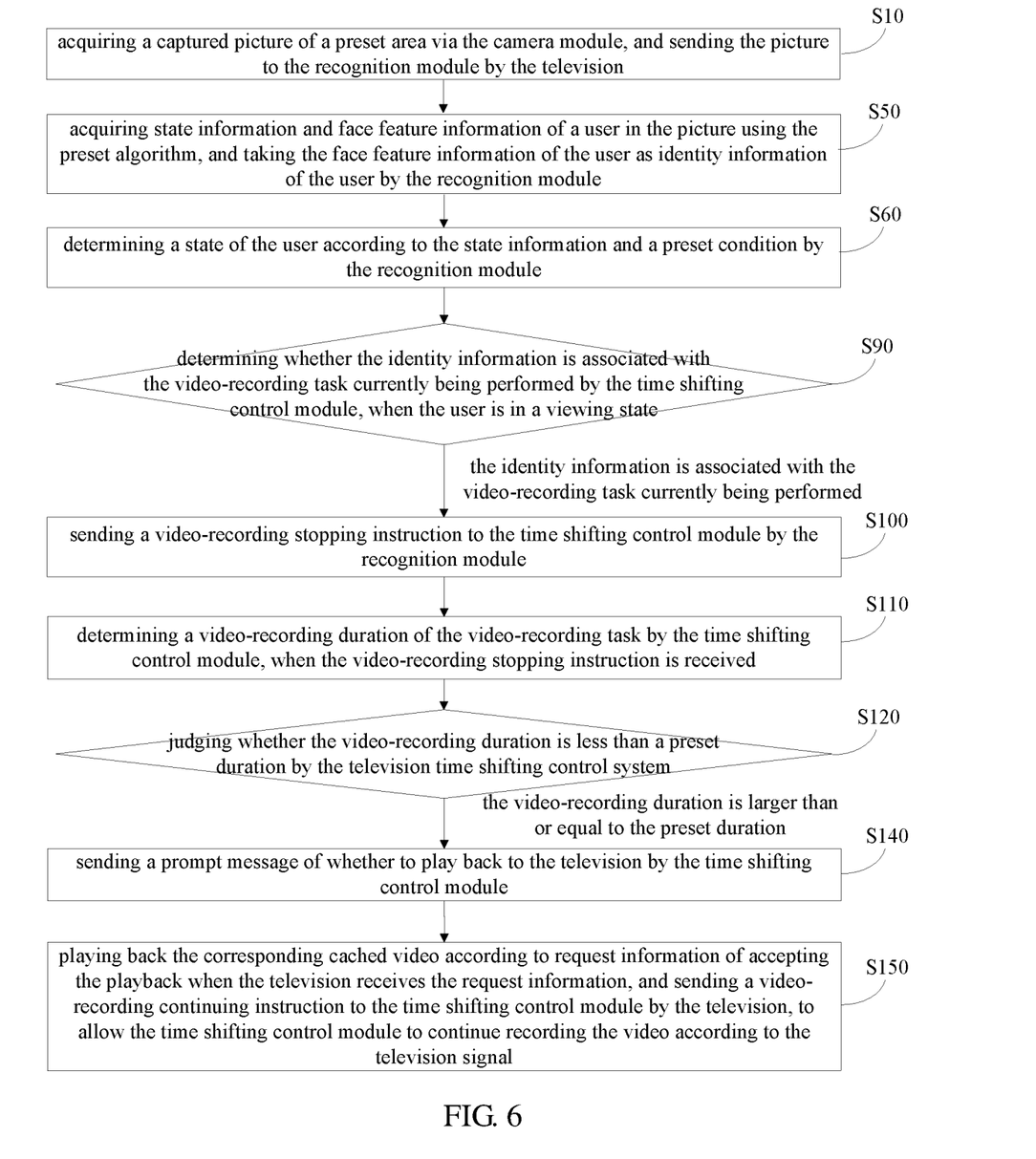
FIG. 6 is an illustrative flowchart of a five embodiment of a television time shifting control method according to the present disclosure.

Further, referring to FIG. 6, FIG. 6 is an illustrative flowchart of a fifth embodiment of a television time shifting control method according to the present disclosure. Based on the above embodiments of the television time shifting control method according to the present disclosure, a fifth embodiment according to the present disclosure is proposed.

Based on the above embodiments, in this embodiment, after step S120, the method further includes:

S140, sending a prompt message of whether to play back to the television by the time shifting control module, when the video-recording duration is larger than or equal to the preset duration; and S150, playing back the corresponding cached video according to request information of accepting the playback when the television receives the request information of accepting the playback, and sending a video-recording continuing instruction to the time shifting control module by the television, to allow the time shifting control module to continue recording the video according to the television signal.

Based on the above embodiments, in this embodiment, the time shifting control system prompts the user to look back the missed television program, if the video-recording duration is larger than the preset duration which has an impact on the user's viewing. A prompt message may be sent to the television, so as to be displayed on screen. For example, the user resumes the viewing state at the time point when the current progress point of the television program is 00:50:35. The information "the viewing breakpoint detected is 00:38:16, whether to play back?" may be contained in the prompt message received by the time shifting control module, two corresponding selection buttons "Yes" and "No" may also be provided under the prompt message on screen, so that the user can select a request of accepting the playback or a request of rejecting the playback. The progress point "00:38:16" is the time point when the user is switching to the nonviewing state, and also the time point when the video-recording task is started. In this embodiment, the user clicking the "Yes" button means that the user accepts the playback. When receiving the request of the user accepting the playback, the television plays back the corresponding cached video from the starting point of the cached video, namely from the actual progress point 00:38:16. The contents after the progress point 00:50:35 is not currently being played, and a video-recording continuing instruction is sent to the time shifting control module. After receiving the video-recording continuing instruction, the time shifting control module continues receiving the contents after the progress point 00:50:35 and buffering the received contents, so that the user can watch the whole television program. In this embodiment, the user can select the request of accepting the playback or the request of rejecting the playback by buttons on a remote control or on the television.

In this embodiment, the time shifting control module sends the prompt message of whether to play back to the television, when the video-recording duration is larger than or equal to the preset duration. After receiving the request of accepting the playback, the television plays back the corresponding cached video according to the request, and sends the video-recording continuing instruction to the time shifting control module, so that the time shifting control module continues recording the video according to the television signal. In the above manner, when the user accepts the playback, the time shifting control module controls the television to play back the cached video, and continues recording the video according to the television signal. As such, the user can watch the complete television program.

Figure 7:
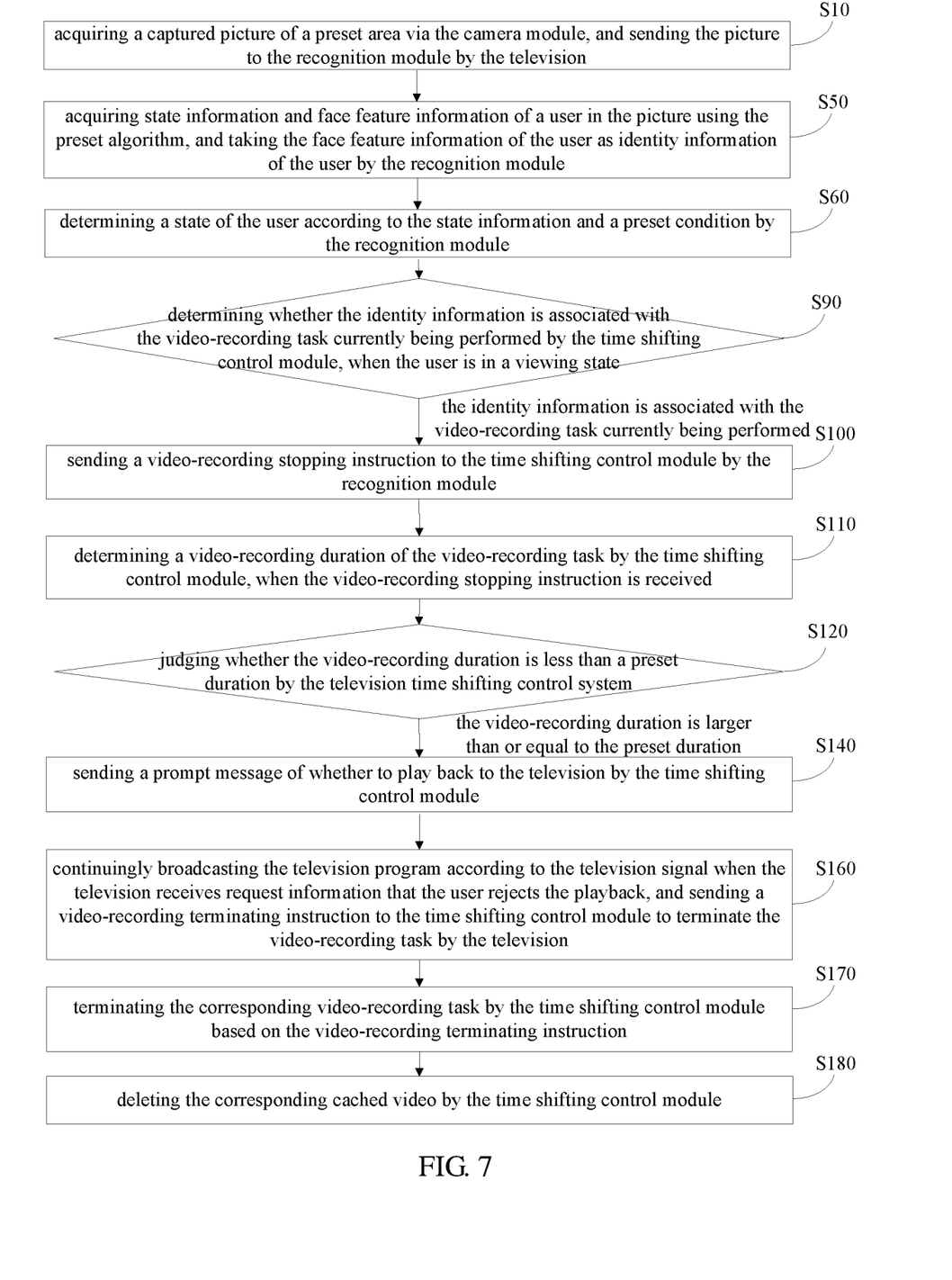
FIG. 7 is an illustrative flowchart of a six embodiment of a television time shifting control method according to the present disclosure.

Further, referring to FIG. 7, FIG. 7 is a schematic flowchart diagram of a sixth embodiment of a television time shifting control method according to the present invention. Based on the foregoing embodiment of the television time shifting control method of the present invention, a sixth embodiment of the present invention is proposed.

Based on the above embodiment, in this embodiment, after step S140, the method includes:

S160, continuingly broadcasting the television program according to the television signal when the television receives request information that the user rejects the playback, and sending a video-recording terminating instruction to the time shifting control module to terminate the video-recording task by the television;

S170, terminating the corresponding video-recording task by the time shifting control module based on the video-recording terminating instruction; and S180, deleting the corresponding cached video by the time shifting control module.

Based on the above embodiments, in this embodiment, the user clicking the "No" button means that the user rejects the playback. When receiving the request of rejecting the playback, the television continues broadcasting the television program according to the currently received television signal. Based on the embodiments, the television continues broadcasting the television program from the progress point 00:50:35, when the user rejects the playback. The time shifting control module records the video from the progress point 00:38:16 to 00:50:35, therefore, there is no need to record contents after the progress point 00:50:35, when the user resumes the viewing state from the progress point 00:50:35. When receiving the request of rejecting the playback, the television broadcasts the television program, and sends a video-recording stopping instruction to the time shifting control module. After receiving this instruction, the time shifting control module stops recording the video at the progress point 00:50:35 of the television program, and obtains the whole cached video corresponding to the video-recording task. The time shifting control module can store the cached video in a preset position, thus convenient for the user to watch. The time shifting control module can also delete the cached video after a preset period of time, to prevent from wasting storage space resources and influencing the user's subsequent viewing.

In this embodiment, when receiving the request that the user rejects the playback, the television continues broadcasting the television program according to the television signal, and sends the instruction of terminating the video-recording task to the time shifting control module. The time shifting control module terminates the corresponding video-recording task according to the termination instruction. The time shifting control module deletes the corresponding cached video. In this way, the television continues broadcasting the television program according to the television signal, when the user rejects the playback. The corresponding video-recording task is terminated, and the corresponding cached video is deleted. The television responds based on the user's operations, which improves interaction with the user and the user's viewing experience.

In addition, the present disclosure also provides a television time shifting control system.

The television time shifting control system of the present disclosure at least includes: a television, a camera module, a recognition module, a time shifting control module, a memory, a processor, and a television time shifting control program stored in the memory, the television time shifting control program when being executed by the processor performs the steps of the above television time shifting control method.

The method implemented when the television time shifting control program being executed on the processor can refer to various embodiments of the television time shifting control method of the present disclosure, thus details are not described herein again.

In addition, the present disclosure also provides a computer-readable storage medium.

The computer-readable storage medium stores a television time shifting control program, the television time shifting control program when being executed by the processor performs the steps of the above television time shifting control method.

The method implemented when the television time shifting control program being executed on the processor can refer to various embodiments of the television time shifting control method of the present disclosure, thus details are not described herein again.

It's to be clarified that the term "include", "comprise" or any other variants thereof is intended to encompass a non-exclusive inclusion, such that a process, method, device, or system including a series of elements not only includes those elements, but also includes other elements that are not explicitly listed, or elements that are inherent to such a process, method, device, or system. In the absence of more restrictions, an element defined by the phrase "including one . . . " does not exclude the existence of additional identical elements in the process, method, device, or system that includes the element.

The numbers of the embodiments according to the present disclosure are merely for description, and do not represent for the advantages and disadvantages of the embodiments.

According to the description of the above-mentioned embodiments, the skilled in the art can clearly understand that the method of embodiments above may be implemented by means of software plus a necessary general hardware platform, of course, also by means of hardware, but in many cases the former is a better implementation. Based on the understanding, the technical solution of the present disclosure can be embodied in the form of a software product in essence or in part contributing to the prior art. The software product is stored in a storage medium (such as a ROM/RAM, a magnetic disk, an optical disk) as described above, including a plurality of instructions for causing a terminal device (which may be a mobile phone, a computer, a server, an air conditioner, or a network device, and so on) to execute the method described in various embodiments according to the present disclosure.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A television time shifting control method, wherein, the television time shifting control method is applied to a television time shifting control system, the television time shifting control system comprises: a television, a camera module, a recognition module, and a time shifting control module, the television time shifting control method comprises:

acquiring a captured picture of a preset area via the camera module, and sending the picture to the recognition module by the television;

acquiring state information and body feature information of a user in the picture using a preset algorithm, and taking the body feature information of the user as identity information of the user by the recognition module;

determining a state of the user according to the state information and a preset condition by the recognition module, and sending a video-recording instruction to the time shifting control module by the recognition module in response to the determination that the user is in a nonviewing state, wherein the video-recording instruction comprises the identity information of the user;

generating a video-recording task according to the video-recording instruction, and recording a video according to the video-recording task and a television signal of a currently played television program by the time shifting control module;

determining whether the identity information is associated with the video-recording task that is currently being performed by the time shifting control module, in response to the determination that the user is in a viewing state;

sending a video-recording stopping instruction to the time shifting control module by the recognition module, in response to the determination that the identity information is associated with the video-recording task that is currently being performed;

determining a video-recording duration of the video-recording task by the time shifting control module, when the video-recording stopping instruction is received;

judging whether the video-recording duration is less than a preset duration by the television time shifting control system; and terminating the video-recording task and deleting a corresponding cached video by the time shifting control module, if the video-recording duration is less than the preset duration.

2. The method according to claim 1, wherein, the nonviewing state comprises a ready-to-leave state or a nonviewing orientation state.

3. The method of claim 1, wherein, the operation of judging whether the video-recording duration is less than a preset duration by the television time shifting control system comprises:

sending a prompt message of whether to play back to the television by the time shifting control module, when the video-recording duration is larger than or equal to the preset duration; and playing back the corresponding cached video according to request information of accepting the playback when the television receives the request information, and sending a video-recording continuing instruction to the time shifting control module by the television, to allow the time shifting control module to continue recording the video according to the television signal.

4. The method of claim 3, wherein after the operation of sending a prompt message of whether to play back to the television by the time shifting control module, the method further comprises:

continuingly broadcasting the television program according to the television signal when the television receives request information that the user rejects the playback, and sending a video-recording terminating instruction to the time shifting control module to terminate the video-recording task by the television; and terminating the corresponding video-recording task by the time shifting control module based on the video-recording terminating instruction.

5. The time shifting control method of claim 4, wherein, after the operation of terminating the corresponding video-recording task by the time shifting control module based on the video-recording terminating instruction, the method further comprises:

deleting the corresponding cached video by the time shifting control module.

6. A television time shifting control system, wherein, the television time shifting control system at least comprises: a television, a camera module, a recognition module, a time shifting control module, a memory, a processor, and a television time shifting control program stored in the memory, the television time shifting control program when being executed by the processor performs acquiring a captured picture of a preset area via the camera module, and sending the picture to the recognition module by the television;

acquiring state information and body feature information of a user in the picture using a preset algorithm, and taking the body feature information of the user as identity information of the user by the recognition module;

determining a state of the user according to the state information and a preset condition by the recognition module, and sending a video-recording instruction to the time shifting control module by the recognition module in response to the determination that the user is in a nonviewing state, wherein the video-recording instruction comprises the identity information of the user;

generating a video-recording task according to the video-recording instruction, and recording a video according to the video-recording task and a television signal of a currently played television program by the time shifting control module;

determining whether the identity information is associated with the video-recording task that is currently being performed by the time shifting control module, in response to the determination that the user is in a viewing state;

sending a video-recording stopping instruction to the time shifting control module by the recognition module, in response to the determination that the identity information is associated with the video-recording task that is currently being performed;

determining a video-recording duration of the video-recording task by the time shifting control module, when the video-recording stopping instruction is received;

judging whether the video-recording duration is less than a preset duration by the television time shifting control system; and terminating the video-recording task and deleting a corresponding cached video by the time shifting control module, if the video-recording duration is less than the preset duration.

7. The system of claim 6, wherein, the television time shifting control program when being executed by the processor further performs the following operations:

sending a prompt message of whether to play back to the television by the time shifting control module, when the video-recording duration is larger than or equal to the preset duration; and playing back the corresponding cached video according to request information of accepting the playback when the television receives the request information, and sending a video-recording continuing instruction to the time shifting control module by the television, to allow the time shifting control module to continue recording the video according to the television signal.

8. A non-transitory computer-readable storage medium, wherein, the computer-readable storage medium stores a television time shifting control program, the television time shifting control program when being executed by a processor performing the following operations:

acquiring a captured picture of a preset area via the camera module, and sending the picture to the recognition module by the television;

acquiring state information and body feature information of a user in the picture using a preset algorithm, and taking the body feature information of the user as identity information of the user by the recognition module;

determining a state of the user according to the state information and a preset condition by the recognition module, and sending a video-recording instruction to the time shifting control module by the recognition module in response to the determination that the user is in a nonviewing state, wherein the video-recording instruction comprises the identity information of the user;

generating a video-recording task according to the video-recording instruction, and recording a video according to the video-recording task and a television signal of a currently played television program by the time shifting control module;

determining whether the identity information is associated with the video-recording task that is currently being performed by the time shifting control module, in response to the determination that the user is in a viewing state;

sending a video-recording stopping instruction to the time shifting control module by the recognition module, in response to the determination that the identity information is associated with the video-recording task that is currently being performed;

determining a video-recording duration of the video-recording task by the time shifting control module, when the video-recording stopping instruction is received;

judging whether the video-recording duration is less than a preset duration by the television time shifting control system; and terminating the video-recording task and deleting a corresponding cached video by the time shifting control module, if the video-recording duration is less than the preset duration.

* * * * *